United States Patent [19]

Jensen et al.

[11] 4,019,234
[45] Apr. 26, 1977

[54] TIRE RASP HAVING REVERSIBLE BLADE HOLDER ASSEMBLIES

[75] Inventors: Wayne E. Jensen, Homewood; Charles Keith Stanfield, Matteson, both of Ill.

[73] Assignee: B & J Manufacturing Company, Glenwood, Ill.

[22] Filed: May 3, 1976

[21] Appl. No.: 682,261

[52] U.S. Cl. .................................................. 29/79
[51] Int. Cl.² ........................................ B23D 71/00
[58] Field of Search ....................................... 29/79

[56] References Cited
UNITED STATES PATENTS

| | | | |
|---|---|---|---|
| 1,354,828 | 10/1920 | Harvey | 29/79 |
| 2,975,504 | 3/1961 | Bentham | 29/79 X |
| 3,528,153 | 9/1970 | Walter | 29/79 |
| 3,618,187 | 11/1971 | Jensen | 29/79 |

*Primary Examiner*—Harrison L. Hinson
*Attorney, Agent, or Firm*—Johnson, Dienner, Emrich & Wagner

[57] ABSTRACT

Tire rasp is disclosed for a tire buffing machine in which the blades and spacers are removably assembled in holders which in turn are removably assembled between the top and base plates of a hub comprising the tire rasp. Each holder and its assembly of blades and spacers are separately removable from the reversible in the tire rasp hub.

22 Claims, 13 Drawing Figures

U.S. Patent  April 26, 1977  Sheet 1 of 2  4,019,234
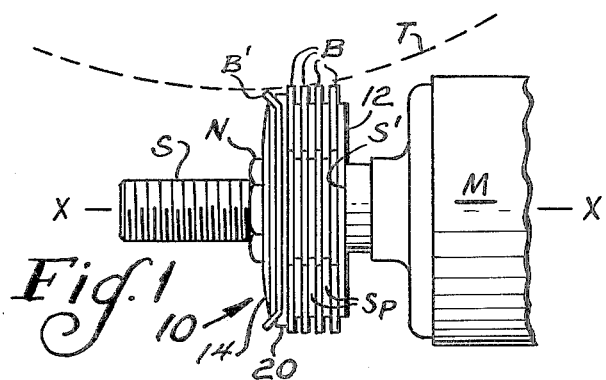
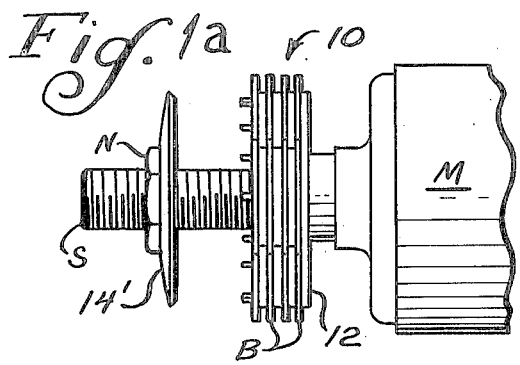
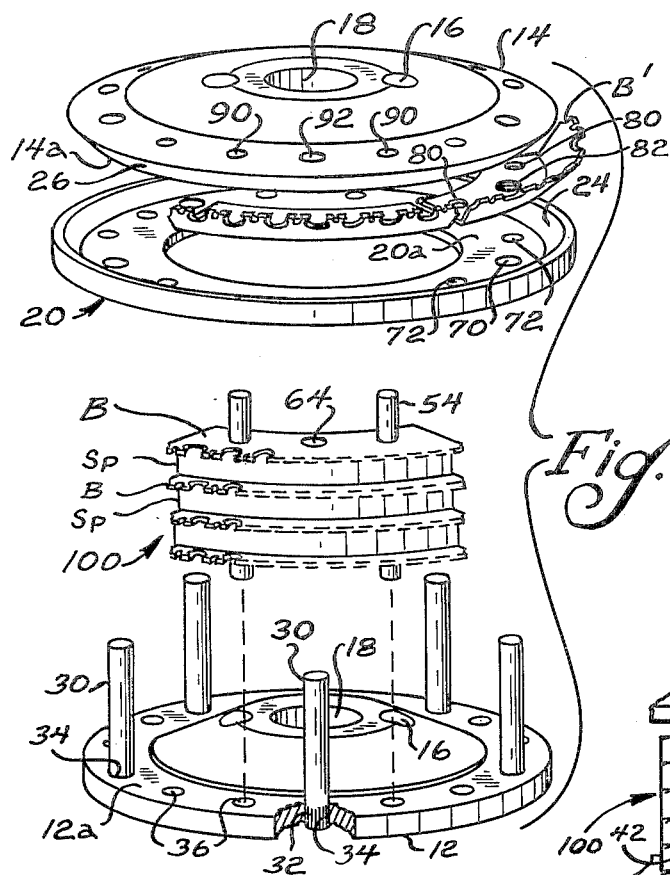
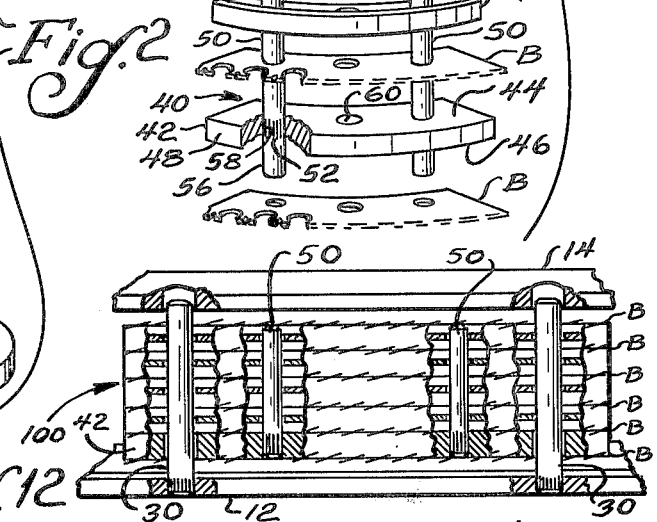
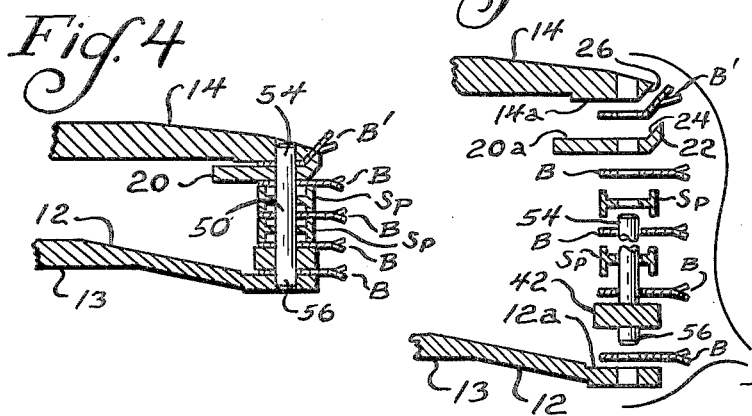
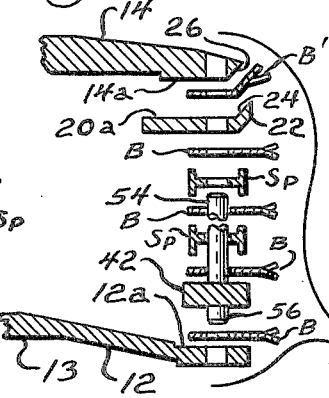
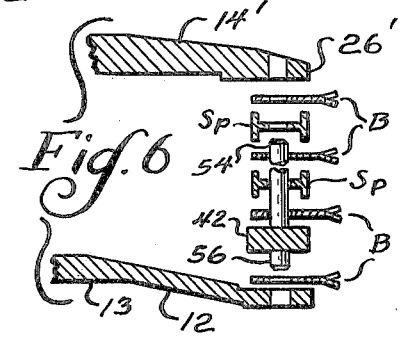

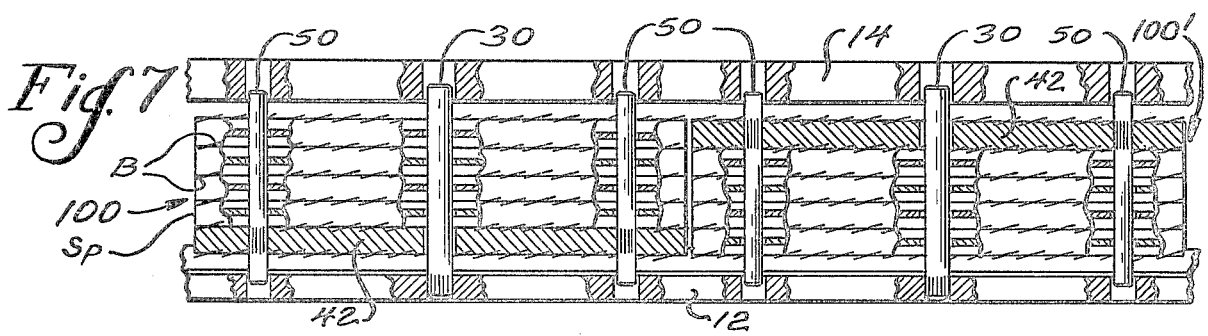
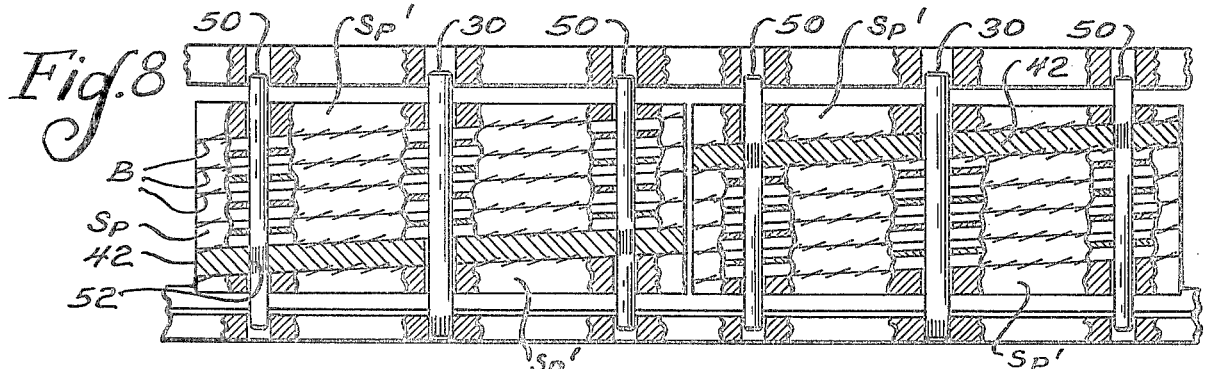
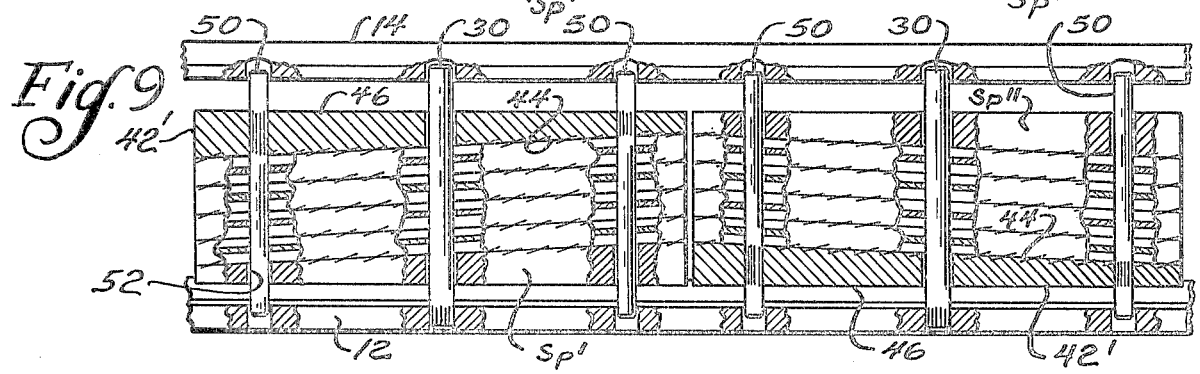
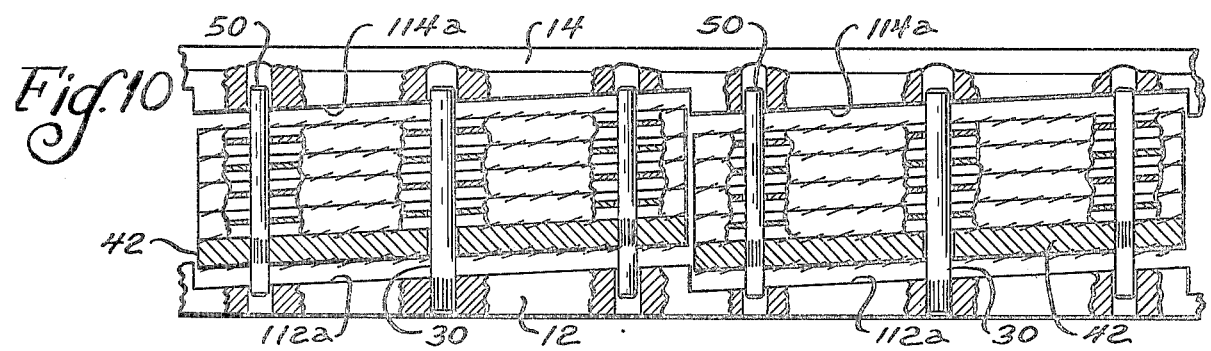
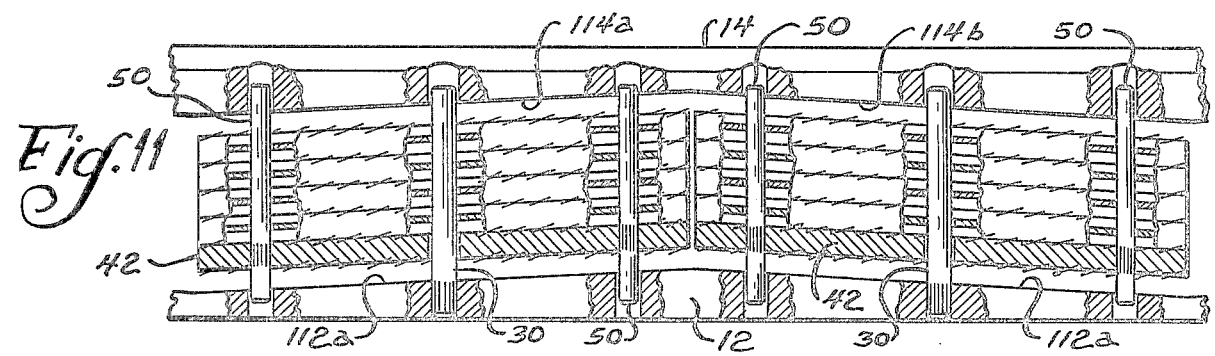

TIRE RASP HAVING REVERSIBLE BLADE HOLDER ASSEMBLIES

This invention relates to tire buffing machines and more particularly to a novel and improved construction of tire rasp hub for such machines.

Conventionally, a tire buffing machine embodies structure on which a tire having a worn tread to be buffed in preparation for applying new rubber is rotated while held against a more rapidly rotating tire rasp having spaced rows of peripherally located teeth which act on the tire tread to loosen, tear, grind off, peel, buff or otherwise remove material from the contacted tire surface. In such a machine the support for the rotating rasp and/or the support for the tire carcass is also moved, one relative to the other, so as to impart a required shape to the remaining surface of the tire carcass on which the new rubber is applied in a subsequent recapping operation.

The teeth of the tire rasp usually comprise the arcuate working edge of several rows of blade segments which, with intervening spacers, are removably pinned between the end plates of the hub. In E. B. Jensen U.S. Pat. No. 2,703,446 such a hub construction is disclosed wherein the back end plate of the hub has pairs of axially directed support pins on which are mounted the buffing blade segments and spacers. The top end plate of the hub, like the blade segments and intervening spacers, have similarly grouped openings in which are received the ends of said support pins when the front plate is closed against the assembled blades and spacers. The hub assembly is completed by clamping the same between a provided shoulder on the drive arbor and a fastener which is threadedly tightened on its connection to the drive arbor and against the top end of the plate.

In normal use, the leading edges of the teeth (considering the direction in which the rasp is rotated) will wear before their trailing edges. Also, the extent and amount of teeth wear will vary in different areas of the rasp periphery in accordance with the resistance met by the teeth in the buffing operation. For example, those teeth in the row initially contacted by the tire as it moves across the rasp usually will wear more rapidly and to a greater extent than will teeth in succeeding rows of blades. For this reason, it has been proposed to shape the trailing edges of the teeth so that they may be utilized by reversing the blades and thereby to extend the blade life. In the past, this has been accomplished by dismounting the rasp from the motor shaft and remounting it in reverse. By such means, the trailing edges of the teeth can be repositioned in relation to the rasp rotation as to make them leading edges. However, this procedure is not always feasible. Furthermore, for total utilization of the blade segments making up a hub it is desirable to reverse only those blades within the rasp having worm teeth and/or to reposition them elsewhere in the blade-spacer assembly. In the past, this has required a considerable amount of blade handling with corresponding loss of productive machine operating time and increased costs of the buffing operation.

Also, in the past, in order to prevent bowing of the pins on which the blades and spacers are supported between the end plates with the accompanying hazard of possible explosion of the blades from the hub during the buffing operation, it was common to strengthen the spacer-blade assembly by locating heavy duty circular spacers in the assembly midway between the hub end plates. The use of such heavy duty spacers, however, further complicated the problems of replacing and/or reversing blades when their teeth became worn.

Thus a principal object of the present invention is to provide a tire rasp or hub in which the blades and spacers are so supported between the end plates of the hub that the blades and spacers may be readily and quickly removed for replacement and/or be reversed.

Still another object of the invention is to provide a construction of tire rasp hub which will facilitate removal and/or replacement of assembled sections of blades and spacers independently of adjacent blade-spacer sections which need not be disturbed.

Another object of the invention is to provide a tire rasp hub construction having removable means on which blade segments and spacers may be separately assembled in sections about the rasp periphery to facilitate removal and/or replacement of only those sections containing damaged or worn blades and to be able to do so independently of adjacent assembled blade-spacer sections.

A further object of the invention is to provide a tire rasp hub with support means for the blades and spacers which will permit replacement and/or reversal of a fraction of the total blade and spacer assembly without having to totally disassemble the rasp itself.

In accordance with this invention said objects are achieved by providing the hub with at least one holder and preferably several holders, having a pair of transverse pins on which several rows of blade segments and spacers may be assembled in a desired sequence or order. The holders in turn are provided with one or more locating holes (and the blades and spacers with similarly located openings) by means of which each holder and its assembly of blades and spacers loaded thereon, sometimes hereinafter referred to as a "cartridge", may be mounted on correspondingly located support pins which are affixed to one or both of the two hub end plates. The hub end plates also have correspondingly located openings to receive end portions of said support pins extending beyond the loaded holder or cartridge so as to complete the hub assembly and locking of the cartridges in place between the end plates of the rasp hub.

In the presently preferred form of the invention, the transverse pins project from opposite sides of the holder and the two end plates of the hub also have related openings into which the opposed ends of said transverse pins extend to reinforce locking of the cartridges between the end plates.

Thus a first feature of the invention is that blades and spacers may be preloaded in holders in readiness for mounting in the hub and between its end plates.

Another feature of the invention is that a single holder and its assembly of blades can be removed, replaced or reversed as a unit within the hub following separation of the top end plate therefrom but without having to dismount other holders and their blade assemblies from the hub.

A companion feature thereto is that where the length of the drive arbor permits, the securing nut or fastener may be unloosened and the top end plate withdrawn to allow removal and/or reversing of one or more holders and their assemblies of blades within the hub and to do so without disturbing the other loaded holders or having to dismount the rasp hub from the drive arbor.

A further feature is the ease and convenience of loading the hub which the invention provides. The holders can be loaded with blades and spacers outside the hub to comprise a limited number of easily handled units or cartridges to be handled during the actual hub loading act.

Spare units also can be preloaded at convenient times for rapid change of worn out or damaged blades as needed.

An important feature of the invention is that the support pins and the locating holes in the holder are of a different, and preferably larger, diameter than are the holder pins and the receiving openings therefor in the hub end plates, so that the cartridge and/or holders can be readily related to the hub plates for assembly.

These larger diametered support pins can be alloyed and/or processed for increased strength, wear and shear resistance while the blade mounting pins provided the holders can be retained in a soft state as a safety support for the blades against the possible fracturing of a support pin during the operation of the buffing machine. In a preferred form, said larger-diametered pins will be of a metal harder than the blade themselves.

Thus a feature of the invention is that the previously required heavy duty circular spacers are no longer required.

A further feature of the invention is that maintenance costs can be reduced since the holders and their soft pins can be discarded as they become cut and scored, thus avoiding the costly and time-consuming labor required for dismantling the blade retention pins of conventional hubs. On the other hand, the support pins provided the hub plates on which the cartridges or holders of the present invention are supported can be of much larger diameter so that their replacement life is also longer.

Also, because of the increased convenience and ease in removing and reversing the cartridges, as compared to handling the individual blades and spacers, there is more incentive to replace or reverse blades rather than to continue buffing with a rasp having a number of poor or worn teeth.

Still another feature of the invention is the versatility afforded to the hubs. The holders can be supplied in wedge shape as well as with opposed parallel sides so as to facilitate ready conversion of a rasp between one having teeth arranged in rows normal to the rotational axis and one where the blades are arranged in rows which spiral or are inclined to said rotating axis.

Many other objects, advantages and/or features obtainable by the invention will be at once apparent, or will become so, upon consideration of preferred embodiments of the invention which now will be described in connection with the accompanied drawings.

Referring to said drawings,

FIG. 1 is a schematic view of a rasp hub of a tire buffing machine and illustrates a first embodiment of the invention which employs both buffing and peeling blades, the hub being shown mounted on the supporting shaft of a motor and in position to buff a tire shown in phantom;

FIG. 1a is a schematic view illustrating a second embodiment of the invention wherein the hub employs only buffing blades, the top plate of the hub being shown moved to a remote position along the motor shaft to facilitate removal of one or more of the blade cartridges with which the hub is loaded;

FIG. 2 is a perspective view of a hub according to FIG. 1, the two end plates, peeler blades, spacer ring and a buffing blade cartridge being illustrated in exploded relation;

FIG. 3 illustrates one such cartridge wherein the holder, its blades and spacers are depicted in exploded relation;

FIG. 4 is a fragmented sectional view of the embodiment of FIG. 1 and shows the component parts in close assembled relation;

FIG. 5 is a fragmented sectional view generally similar to FIG. 4 and shows the components in exploded relation;

FIG. 6 is a fragmented sectional view of a second embodiment of the invention and shows its component parts in exploded relation;

FIG. 7 is a diagramatic view partially fragmented and sectioned and illustrated two cartridges partially separated from the hub end plates, one of the cartridges being illustrated as assembled in reverse between the hub end plates;

FIGS. 8 through 11 are views generally similar to FIG. 7 and illustrates further forms of the invention and alternate mountings of the cartridges; and FIG. 12 shows a further modification of the invention.

Referring now more specifically to the several views, FIG. 1 illustrates a tire rasp 10 in accordance with the present invention mounted on shaft S of the motor M of a conventional tire buffing machine to turn with said shaft. As shown, tire rasp 10 is held against shoulder S' by nut N which is tightened on its threaded connection to shaft S to clamp the tire rasp 10 therebetween. Preferably, shoulder S' has a pair of axially-directed drive pins (not shown) which pass through similarly spaced aligned openings 16 in the tire rasp 10 to lock the tire rasp to motor shaft S. T represents a more slowly rotating tire mounted on a provided support of the buffing machine in position for peeling and buffing engagement by blades B and B' which are pined between the bottom and top end plates 12,14 of the tire rasp 10 as afterwards described. Such a buffing machine is of conventional construction and plays no part of the present invention and will therefore not be particularly described.

Referring now to FIG. 2, tire rasp 10 comprises a bottom plate 12, a top plate 14, and an intermediate annular plate 20 between which are pinned a first row of peeling blades B' and further rows of buffing blades B. Bottom plate 12 and top plate 14 each embody a relatively thick circular disk of high quality forged aluminum alloy or other rugged strong metal having a central opening 18 in which motor shaft S is received and adjacent diametrically opposed smaller-sized openings 16 which receive the previously described drive pins for securing the rasp against rotation on shaft S. The outer side of bottom plate 12 has a centrally recessed planar bearing surface 13 centered about shaft opening 18 against which shoulder S' engages, said surface 13 being normal to the cylindrical axis of shaft opening 18 which coincides with the rotational axis x—x of motor shaft S when properly assembled thereon. The inner facing sides of the two disks 12,14 have planar, parallel-disposed annular surfaces 14a and 12a adjacent their outer peripheral edges with which the blades are aligned. In this first described embodiment of the invention, surfaces 14a and 12a are also disposed normal to bearing surface 13 and thereby the cylindrical axis of the shaft receiving openings 18. The central area of both the base plate 12 and the top plate 14 may be thicker than the peripheral portions thereof as illustrated. Annular plate 20 has similarly arranged, parallel disposed planar surfaces 20a on its opposed sides and a peripherally disposed flange portion 22 provided with an inner inclined or conical surface 24 which complements the conical-shaped outer peripheral edge 26 of the top end plate 14.

Both buffing blades B and peeling blades B' are of conventional construction, being stamped or otherwise formed from sheet metal into convexo-concave shaped arcuate segments of a predetermined constant angular extent wherefore, four, five or other number of blades would be required if the blades were arranged end-to-end to complete a circle. In the illustrated example, both buffing blades B and peeling blades B' have an angular extent of near 72° wherefore five blades arranged end-to-end complete a full annular row or circle. The peeler blades B' embody an essentially planar mounting portion having a laterally inclined conical flanged portion along their convex side which terminates in an interrupted outer working edge embodying spaced dove-tail shaped teeth, for example, as disclosed and claimed in W. E. Jensen U.S. Pat. No. 3,618,187. Said peeling blades B' are shown in FIGS. 1 and 2 arranged in end-to-end relation between the facing surfaces 20a of annular plate 20 and 14a of top plate 14, the inclined conical flange portion of said peeling blades being located between conical surface 24 of the annular plate 20 and complementing conical surface 26 of the top plate 14. The teeth of the peeler blades project outwardly of the rasp hub and are inclined to the axis x—x of the rasp 10 as illustrated best in FIG. 1. The thus inclined teeth of the peeling blades effectively engage the tire T with rotation of the tire rasp 10 to peel heavy strands from the engaging surface of the tire carcass as more completely described in the above mentioned U.S. Pat. No. 3,618,187.

Buffing blades B preferably also have dove-tail shaped teeth and a notched outer edge as for example is disclosed in E. B. Jensen U.S. Pat. No. 2,896,309 or W. E. Jensen and C. K. Stanfield U.S. Pat. No. 3,879,825. Unlike the peeling blades B', however, the teeth of buffing blades B are disposed generally in the plane of their body portions and are provided with a set or twist as described in the aforementioned patents. When arranged between the facing planar surfaces 20a of annular plate 20 and 12a of bottom plate 12, the teeth of the buffing blades are disposed generally radial, that is at right angles to axis x—x (FIG. 1) and project outwardly from the hub periphery a radial distance slightly greater than does the outer edge of the inclined teeth of the peeling blades B'.

In accordance with this invention, the tire rasp hub 10 employs novel means for removably securing the rows of buffing blades B and their intervening spacers Sp in a desired working relation to the peeling blades B' and motor shaft S on which the tire rasp hub 10 is mounted in the tire buffing machine.

As illustrated by FIG. 2, the hub bottom plate 12 has a plurality of axially-directed over-sized cylindrical support pins 30, which are of hardened steel. As illustrated, each said pins 30 is provided with a knurled end 32 which is press-fitted within a provided opening 34 of the bottom plate 12. One such pins is provided for each of the blades making up a row. In the embodiment illustrated by FIG. 2, there are five such pins, said pins 30 being equally spaced circumferentially about surface 12a and projecting therefrom at right angles thereto.

Considering also FIG. 3 with FIG. 2, in accordance with this invention, buffing blades B and their spacers Sp are preloaded in a desired sequence on separately constituted holders indicated generally at 40 to comprise a cartridge 100. In the described embodiment, each holder 40 serves to support one sequence of blades B and spacers Sp. Thus the number of holders 40 correspond to the number of blades required to complete a circular row in the hub. Each said holders 40 comprises a convexo-concave shaped segment 42 of an annulus having an angular extent corresponding to that of the blades B and spacers Sp to be assembled therewith. Said holder segments 42 preferably are formed of a quality high tensile aluminum material or alloy aluminum forging or casting. They are generally solid and rectangular in cross-section, and have parallel flat top and bottom surfaces 44,46 and an outer convex side wall 48. Preferably the radius of said convex side wall 48 approximates the radius on which the peripheral edge of the bottom end plate 12 is defined.

Projecting from opposed surfaces 44,46 of the holder segments 42 are pairs of transversely extending steel pins 50 disposed at right angles to segment surfaces 44,46 and equidistantly spaced from said outer convex edge 48 of the segment 42. Said transverse pins 50 provide means on which blades B and spacers Sp may be assembled in the holder 40. Preferably said blade holding pins 50 are of cylindrical shape and have a constant diameter less than that of the aforementioned support pins 30 which are provided bottom plate 12. As illustrated in FIG. 3, transverse pins 50 similarly have a knurled portion 52 intermediate their upper and lower ends 54,56 respectively press-fitted within provided openings 58 of holder segment 42 and are thereby rigidly secured to the segment 42. Midway between pins 50, holder segment 42 is provided with an appropriately sized locating hole 60 through which one of said support pins 30 is extended in the mounting of the holder 40 with the bottom plate, said holders 40 and their blades B being also aligned thereby with the outer edge of the bottom plate 12.

In accordance with this invention, buffing blades B and spacers Sp each have a pair of circular-shaped openings 62, one of which may be somewhat elongated. These openings 62 are spaced apart a constant distance which corresponds to the separation of the transverse pins 50 from each other such that the buffing blades B and spacers Sp may be assembled in their desired sequence on the holder segment 42 with the outer edges of the blades B projecting beyond the outer convex side 48 of the holder segment. Preferably, the outer convex side of the spacers Sp are so assembled that they substantially align with or are disposed slightly inward of the convex side 48 of the holder segment 42 and therefor do not project beyond the hub periphery. Buffing blades B and spacers Sp are also provided with a third opening 64 located midway between the transverse pins 50 and which aligns with the locating hole 60 provided holder segment 42. Openings 64 have approximately the same diameter as the locating hole 60. Each holder 40 when thus loaded with blades and spacers comprises a cartridge of limited angular extent corresponding to that of one blade which cartridge is then assembled as a unit on a respective support pin 30 with the lower end 56 of its transverse pins being received within related openings 36 of the bottom plate 12.

Assembly of the tire rasp thereafter is completed as illustrated in FIG. 2 by next loading the hub annular plate 20 over the assembled cartridges 100, said annular plate 20 being rotated to align its oversized openings 70 and related smaller openings 72 to receive the ends of the support pins 30 and the upper portions 54 of the transverse pins 50 of the holder which extend through and beyond the blades and spacers assembled on the holder segments 42. Peeler blades B' which are similarly provided with oversized openings 80 and smaller sized openings 82 in the same spacing are next assembled in a row on the annular hub plate 20 by locating the projecting ends of the transverse pins 50 and support pins 30 through openings 82 and 80. The assembly is completed by aligning top plate 14 over the peeler blades and so that the projecting ends of the support pins 30 are received in its openings 90 and the projecting ends of transverse pins 50 in its smaller sized related openings 92. The thus assembled hub with its buffing and peeling blades is then ready to be mounted over motor shaft S as illustrated in FIG. 1 and nut N tightened to secure the assembled tire rasp 10 in place against shoulder S'. The thus completed assembly of buffing blades B', spacers Sp and peeler blades B' with the bottom plate 12, top plate 14 and intermediate annular plate 20 of the hub is illustrated in FIG. 4.

In a second embodiment of the invention which is illustrated by FIGS. 1a and 6, and only rows of buffing blades B are assembled between the bottom end plate 12 and top end plate 14'. Thus in this embodiment, the annular intermediate plate 20 of the first described embodiment is dispensed with and its top plate 14' is provided with a squared peripheral edge 26' which corresponds to the illustrated squared outer edge of its bottom plate 12. In other respects, the two described embodiments of the invention are the same.

In the embodiments thus far described, the lower projecting portion 56 of the transverse pins 50 are substantially shorter than the length of the projecting upper portion 54 thereof. The length of pin portions 56 is illustrated as only long enough to receive one blade mounted thereon between the segment 42 and the surface 12a and then be fully received within provided opening 36 of the bottom plate 12. It will be appreciated, however, that the projecting end portions 54,56 of the blade supporting pins 50 may be equal in length or of any desired ratio. However, the first described arrangement wherein the upper pin end 56 is substantially longer is to be preferred. As illustrated by FIG. 3 it permits a substantially full assembly of blades and spacers to be supported on the holder segment 42 on top side of the holder segment 42, thus making for convenient handling of the cartridge outside the hub 10. In their preferred form segments 42 will have a thickness approximately the thickness of the spacers Sp wherefore they usefully act as one of the spacers for locating the rows of buffing blades B. However, again, this is according to operator preference and segments 42 could have a thickness approaching that of the blades themselves. The primary function of the holder segment 42 is to provide a unit with transverse pins 50 on which the blades B and spacers Sp can be mounted and arranged in a desired sequence and spacing in advance of being assembled between the end plates 12,14, or between the bottom end plate 12 and annular plate 20 as in the first described embodiment.

In the illustrated embodiments of the invention thus far described, the transverse pins 50 of the holders 40 are intentionally of a length such that their lower portion 56 project into provided openings 36 of the base plate 12 and their upper ends 54 into provided openings 92 of the top plate 14 when the loaded cartridge 100 is assembled between said plates. As illustrated openings 36 and 92 are through holes. It will be understood, however, that such holes 36,92 could be blind holes. In the latter event, however, they should have a depth sufficient to fully receive the projected ends of pin portions 54,56 so that the cartridges of blades and spacers are snugly held between base plate 12 and top plate 14 or annular plate 20 as the case may be.

Under some circumstances it may be preferred to shorten the projections of the transverse pins 50 so that their portions 54,56 serve their function of supporting the buffing blades B and spacers Sp on their holders 40 between end plates 12,14 of the tire rasp hub but do not lock with said plates. Such an arrangement is illustrated in FIG. 12 wherein bottom plate 12 is illustrated as provided with pairs of support pins 30 corresponding in number and spacing to the number of cartridges 100 to be assembled between the plates. In this embodiment blades B, holder segments 42 and also top plate 14 are provided with appropriate sized and spaced pairs of openings to receive the pairs of support pins 30 inserted through each cartridge unit in the assembled hub. In this further embodiment of the invention, however, transverse pins 50 of the holder segments 42 project from only one side thereof and blades B and spacers Sp are assembled to the full projection height of the pins 50. Thus, in the embodiment illustrated by FIG. 12, openings 36 and 92 are omitted from the end plate and the two support pins 30 which pass through the holder segment 42 and its loaded assembly of blades and spacers constitute the means by which the cartridges are locked to the end plates.

It should be pointed out, however, that the first described embodiments are presently preferred because, first of all, the blades are locked to each of the end plates 12,14 by two sets of three pins (projecting portions 54,56 of the of the transverse pins 50 in openings 36 and 90 and supports pins 30) rather than by two pins 30 as in the embodiment of FIG. 12. Secondly, and perhaps most importantly, in the embodiments illustrated by FIGS. 2–6 locking of the cartridges 100 to the end plates 12,14 by the projection of the opposed ends of the transverse pins 50 into the receiving openings 36 and 92 of said end plates 12,14 introduces an important safety factor. The larger-diametered support pins 30 by reason of their hardened state provide resistance to the wear and shearing action exerted on said support pins by the blades as their teeth move into and out of engagement with the tire carcass during the buffing act. However, the hardened support pins 30 are more subject to fracturing through metal fatigue after prolonged use. The softer pins of the holders 40, on the other hand, although easier to cut are more pliant, tougher and less subject to fracturing. Of consequence, the transverse pins 50 being also locked to the end plates 12,14 provide an added measure of safety in that are available in an emergency to retain the blades within the hub against the possibility of the blades being released from the hub upon shattering of the support pins 30.

Referring now to FIGS. 1 and 1a, and considering the same with FIG. 7, a feature of the present invention is that the disclosed mounting of the blades and spacers on individual holders 40 facilitates nor only loading of the buffing blades within the tire rasp hub but also facilitates their removal for replacement or reverse mounting within the hub 10 to extend the rasp life. As illustrated by FIG. 1a, such may be accomplished by first loosening nut N to permit top plate 14 or 14' to be moved far enough along shaft S to allow one or more of the loaded holders 40 to be moved off its support pin 30 and to do so without disturbing the support of the other holders 40 on the bottom plate 12. It will be understood that in the case of the first described embodiment (FIG. 1) it will be necessary to first unload the peeler blades B' and also to separate annular plate 20 from the transverse pins 50 and support pins 30 before the individual cartridges 100 (or the holders 40 and their assembled blades and spacers) can be separated from the support pins 30 on which they are assembled. Therefore, in the event one or more of the blades of a cartridge 100 has been damaged or excessively worn, it is a relatively simple matter to remove the cartridge or cartridges containing the damaged or worn blades and the same can be accomplished without dismounting the hub from the buffing machine.

The invention also facilitates reverse mounting of several or all of the blades in the rasp. For example, FIG. 7 illustrates the left-hand cartridge unit 100 assembled between the bottom and top plates 12,14 with its holder segment 42 disposed adjacent bottom plate 12 whereas in the right-hand cartridge 100' the holder segment is shown located next to the top plate 14, that is in reverse to the disposition of cartridge 100. Thus, as the leading edge of the teeth of the buffing blades start to wear and lose their cutting ability with extended use, one or as many of the cartridge units as necessary may be removed and reinserted into the hub in reverse position so that the trailing edges of the blade teeth in that cartridge become leading edges and thereby extending the life of the blades. Thus, it is no longer necessary either to dismount the rasp hub from the drive arbor on which it is fixed in the buffing machine or to individually handle the blades and spacers once the hub has been bodily removed from the buffing machine. In accordance with the present invention, each assembled section of blade segments and spacers comprises a cartridge of a size easy to handle, (in the illustrated embodiment there are five such cartridges), and the reverse mounting of the blades is easily accomplished.

In the thus far described embodiments of the invention, cartridges 100 are described as comprising buffing blades B and spaces Sp which are supported in spaced parallel rows on holders 42 which when the cartridges are assembled in the rasp hub are disposed at right angles or normal to the axis on which the hub rotates. However, it is also desirable under some circumstances that the blades be arranged in spiraling rows about the hub or in zig-zag fashion such that the teeth follow an oscillating path across the width of the contacted surfaces of the tire carcass being buffed. FIG. 8 illustrates cartridges in which the blades may be assembled to have this relationship when the cartridges are assembled in the rasp hub. Thus in FIG. 8, openings 52 into which the transverse pins 50 are fixed to the holder segments 42 are shown drilled at a small angle from normal. The cartridges are assembled between the hub end plates 12 and 14 with wedge-shaped spacers Sp' immediately adjacent end plates 12,14, such that the spaced rows of blades B and their spacers are arranged by the pins in spiraling rows about the periphery of the hub. In an alternate arrangement illustrated by FIG. 9, holes 52 are inclined at right angles to bottom surface 46 of the holder segments but the top surfaces 44 are inclined at a small angle so as to accomplish the same purpose. In such an arrangement the last spacer loaded onto the transverse pins 50 would have a similar wedge shape as indicated at Sp''.

FIG. 10 illustrates a further embodiment of the invention where the facing surfaces 12a and 14a of the hub end plates are divided into steps 112a and 114a each having an angular extent corresponding to that of the holder segments 42. In this embodiment, the transverse pins 50 are inclined at a small angle to the holder segments 42 as in the FIG. 8 embodiment above described. In this arrangement, the wedge-shaped spacers Sp' required in the FIG. 8 embodiment are not needed to achieve the spiraling effect.

FIGS. 8 and 10 thus illustrate a hub assembly wherein the transverse pins 50 of the illustrated cartridges are inclined at the same angle to the holder segments 42 in which they are fixed. FIGS. 9 and 11 illustrate an assembly of cartridges 100 wherein the transverse pins of every other cartridge is reversely inclined to its holder segment 42 and so that the rows of teeth of the assembled blades are effectively arranged in a zig-zag relation so as to effect an oscillation of the blade teeth across the width of the tire carcass in rotation of the hub.

From the above description of preferred embodiments of the invention and modifications thereof it will be apparent that all of the recited objects, advantages and features of the invention have been demonstrated as obtainable in a highly effective structure and ones which are also practical to manufacture and utilize.

Thus having described the invention, what is claimed is:

1. Rasp hub for a tire buffing machine comprising a pair of mounting plates between which are supported blades preloaded on plate-like holder means, the holder means having pin-like projections on which the blades are loaded, at least one of the mounting plates having spaced support pins, the holder means having locating holes through which said support pins pass, and the other hub mounting plate having openings in which the ends of said support pins are received when the mounting plates of the hub are closed against the holder means and blade assemblies thereon.

2. Rasp hub for a tire buffing machine as claimed in claim 1 wherein the holder means are at least two in number, and said support pins serve to support the remaining of said holder means and blade assemblies on the mounting plate first mentioned in claim 1 when the other hub mounting plate is moved away from the blade assemblies and one of the holder means and its blade assembly is removed.

3. Rasp hub for a tire buffing machine as claimed in claim 1 wherein the locating holes and support pins which pass therethrough have a diameter greater than the diameter of the pin-like projections.

4. Rasp hub for a tire buffing machine as claimed in claim 1 wherein the support pins are of hardened steel and the pin-like projections are of a tough more soft metal.

5. Rasp hub for a tire buffing machine as claimed in claim 1 wherein the holder means comprise several segments of a circle arranged in end-to-end relation to form a complete circle, each said segments having a pair of said pin-like projections and a locating hole therebetween, said mounting plates embodying disks one of which has peripherally located support pins which align with the said locating holes of the segments and the other of said disks having openings grouped to receive the ends of said support pins and said pin-like projections.

6. Rasp hub for a tire buffing machine as claimed in claim 5 wherein the pin-like projections project from both sides of the segments and each disk has openings to receive the ends of said pin-like projections.

7. Rasp hub for a tire buffing machine as claimed in claim 6 wherein the support pins and the locating holes therefor in the holder have a cross section greater than that of the pin-like projections.

8. Rasp hub for a tire buffing machine as claimed in claim 7 wherein the support pins are of metal highly resistant to wear and shear and the pin-like projections are of a softer, tough metal.

9. Rasp hub as claimed in claim 1 wherein each said mounting plates have support pins which pass through locating holes of the holder means and are received in openings provided the other mounting plate.

10. A holder on which tire buffing blades are preloaded for assembly in a tire buffing machine hub between two mounting disks thereof one of which disks has peripherally located spaced loading pin means which extend parallel to the axis on which the hub is rotated and are received in openings provided the other disk, said holder comprising a segment having a curved outer edge and inwardly located parallel spaced transverse pins fixed thereto on which the blades are loaded in rows with their working edge projecting beyond the curved edge of the segment, said segment containing aperture means axially disposed parallel to said transverse pins through which the hub loading pin means pass, said aperture means being related to the transverse pins such that the working edge of blades loaded on said transverse pins will protrude beyond the hub periphery when the holder is assembled on the hub pin means and the hub disks closed against the holder and blades assembled thereon.

11. A holder as claimed in claim 10 wherein the transverse pins extend through the segment and project from both sides thereof.

12. A holder as claimed in claim 10 having blades and spacers loaded on said transverse pins, the segment having an axial dimension approximating that of the spacers loaded on the transverse pins thereof.

13. A holder on which tire buffing blades having three constantly spaced holes are preloaded for assembly between mounting disks of a tire buffing hub, said holder comprising a segment having opposed flat sides and a curved outer side, a pair of parallel spaced transverse pins fixed to and extending outwardly of said flat sides on which pins blades are assembled utilizing two of their three holes, said segment also having a locating hole related to said pins which aligns with the third hole of the blades when assembled thereon so as to be receivable in appropriately located openings in the two mounting disks of the hub when the holder and its assembled blades are located therebetween and the mounting disks closed thereagainst.

14. A holder as claimed in claim 13 wherein its locating hole is centered between the transverse pins and its axis is directed parallel to the pins.

15. A holder as claimed in claim 14 wherein the locating hole has a diameter greater than the diameter of the transverse pins.

16. A holder as claimed in claim 14 wherein the segment has parallel opposed flat surfaces.

17. A holder as claimed in claim 14 wherein one of the flat surfaces of the segment is inclined to the opposite flat surface.

18. A holder as claimed in claim 16 wherein the locating hole and transverse pins are n axially parallel relation but at an angle other than normal to the flat opposed sides thereof.

19. Rasp hub for a tire buffing machine comprising a pair of circular-shaped mounting plates adapted to support assemblies of blades and spacers therebetween with the working edge of the blades exposed about the hub periphery which blades and spacers comprise segments of a circle and each have at least three constantly located mounting holes, the hub further comprising separate holder means for each said assemblies of blades and spacers, which separate holder means embody a segment of arcuate extent no greater than that of the blades and spacers assembled thereon, each said segments having a pair of fixed, parallel spaced pin means protruding from opposite sides of the segment on which blades and spacers may be assembled utilizing two of their aligned mounting holes, said segments having a locating hole related to said pairs of pin means which center with the remaining holes of the blades and spacers assembled therewith, one of the hub mounting plates having spaced pairs of openings to receive the pin means protruding from one side of the segment, said mounting plate also having support pins related to each said pairs of openings and which are of a length to pass through the locating holes of the blades and spacers assembled on the segments when said pin means are received in the related pairs of openings, and the other of the hub mounting plates having groups of related openings located to receive the support pins of the first mentioned hub mounting plate and the pin means protruding from the opposite side of the segment as when the two hub mounting plates are closed against the assemblies of blades and spacers on their respective holder means, one of said holder means and its assembly of blades and spacers being readily separable from the hub without dismounting the other blade and spacer assemblies from the first mentioned hub mounting plate.

20. Rasp hub for a tire buffing machine as claimed in claim 19 wherein the locating holes of the segments and support pins of the mounting plate have a diameter greater than the diameter of the pin means of the segments and the openings of the mounting plates which receive said pin means.

21. Rasp hub for a tire buffing machine as claimed in claim 19 wherein the support pins are of a hard wear resistant metal and the pin means are of a softer metal.

22. Rasp hub for a tire buffing machine as claimed in claim 19 wherein the locating holes of the segments are centered between the pin means thereof.

* * * * *

UNITED STATES PATENT OFFICE
CERTIFICATE OF CORRECTION

PATENT NO. : 4,019,234
DATED : April 26, 1977
INVENTOR(S) : Wayne E. Jensen & C. K. Stanfield It is certified that error appears in the above-identified patent and that said Letters Patent are hereby corrected as shown below:

Abstract, line 6,     Change "the" to --and--;

Column 1, line 58,    Change "worm" to --worn--;

Column 3, line 14,    Pluralize cartridge;

Column 4, line 23,    Singularize illustrates;

Column 7, line 57,    Change "approximately" to --approximating--;

Column 9, line 51,    Change "spaces" to --spacers--;

Column 12, line 13,   Change "n" to --in--;

Signed and Sealed this nineteenth Day of July 1977

[SEAL]

Attest:

RUTH C. MASON
*Attesting Officer*

C. MARSHALL DANN
*Commissioner of Patents and Trademarks*